US012347293B2

(12) United States Patent
Alexis

(10) Patent No.: US 12,347,293 B2
(45) Date of Patent: Jul. 1, 2025

(54) ARTICLE SURVEILLANCE TAG ATTACH/DETACH MECHANISM

(71) Applicant: Sensormatic Electronics, LLC, Boca Raton, FL (US)

(72) Inventor: Mark Daniel Alexis, Wellington, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 18/592,872

(22) Filed: Mar. 1, 2024

(65) Prior Publication Data

US 2024/0203224 A1 Jun. 20, 2024

Related U.S. Application Data

(63) Continuation of application No. 17/012,772, filed on Sep. 4, 2020, now Pat. No. 11,922,786.

(60) Provisional application No. 62/908,256, filed on Sep. 30, 2019.

(51) Int. Cl.
*G08B 13/24* (2006.01)

(52) U.S. Cl.
CPC ..... *G08B 13/2434* (2013.01); *G08B 13/2417* (2013.01); *G08B 13/2442* (2013.01)

(58) Field of Classification Search
CPC ............ G08B 13/2434; G08B 13/2402; E05B 73/0017; E05B 73/0064; E05B 73/0052; Y10T 70/5004
See application file for complete search history.

(56) References Cited

U.S. PATENT DOCUMENTS

| | | | | |
|---|---|---|---|---|
| 2009/0128341 A1* | 5/2009 | Skjellerup | E05B 73/0017 | 340/572.9 |
| 2014/0123714 A1* | 5/2014 | Ho | E05B 73/0005 | 70/57.1 |
| 2017/0193777 A1* | 7/2017 | Sayegh | G08B 13/2465 | |
| 2019/0027009 A1* | 1/2019 | Miettinen | G08B 13/1463 | |
| 2019/0188982 A1* | 6/2019 | Lavery | G08B 13/246 | |
| 2020/0157854 A1* | 5/2020 | Piccoli | E05B 73/0041 | |

* cited by examiner

*Primary Examiner* — Mirza F Alam
(74) *Attorney, Agent, or Firm* — ArentFox Schiff LLP

(57) ABSTRACT

The present disclosure relates to a mechanism inside of the tag which detaches the tag when presented to a detacher system containing a rotating magnet array that retracts the tag pin allowing the tag to be removed from the garment.

20 Claims, 9 Drawing Sheets

TOP VIEW

ARTICLE SURVEILLANCE TAG ATTACH/DETACH MECHANISM

CROSS-REFERENCE TO RELATED APPLICATION(S)

The present application is a continuation application of U.S. patent application Ser. No. 17/012,772, filed Sep. 4, 2020, which claims the benefit of U.S. Provisional Application Ser. No. 62/908,256, entitled "Article Surveillance Tag attach/detach mechanism" and filed on Sep. 30, 2019, which are expressly incorporated by reference herein in their entirety.

BACKGROUND

This document relates generally to security tags used in Electronic Article Surveillance ("EAS") systems. More particularly, this document relates to security tags and mechanisms for tag attachment/detachment.

A typical EAS system in a retail setting may comprise a monitoring system and at least one security tag or marker attached to an article to be protected from unauthorized removal. The monitoring system establishes a surveillance zone in which the presence of security tags and/or markers can be detected. The surveillance zone is usually established at an access point for the controlled area (e.g., adjacent to a retail store entrance and/or exit). If an article enters the surveillance zone with an active security tag and/or marker, then an alarm may be triggered to indicate possible unauthorized removal thereof from the controlled area. In contrast, if an article is authorized for removal from the controlled area, then the security tag and/or marker thereof can be detached therefrom. Consequently, the article can be carried through the surveillance zone without being detected by the monitoring system and/or without triggering the alarm.

Radio Frequency Identification ("RFID") systems may also be used in a retail setting for inventory management and related security applications. In an RFID system, a reader transmits a Radio Frequency ("RF") carrier signal to an RFID device. The RFID device responds to the carrier signal with a data signal encoded with information stored by the RFID device. Increasingly, passive RFID labels are used in combination with EAS labels in retail applications.

As is known in the art, security tags for security and/or inventory systems can be constructed in any number of configurations. The desired configuration of the security tag is often dictated by the nature of the article to be protected. For example, EAS and/or RFID labels may be enclosed in a rigid tag housing, which can be secured to the monitored object (e.g., a piece of clothing in a retail store). The housing cannot be removed from the clothing without destroying the housing except by using a dedicated removal device.

A typical retail sales transaction occurs at a fixed Point Of Sale ("POS") station manned by a store sales associate. The store sales associate assists a customer with the checkout process by receiving payment for an item. If the item is associated with an EAS/RFID element, the store sales associate uses the dedicated removal device to remove the security tag from the purchased item. A retail sales transaction can alternatively be performed using a mobile POS unit. Currently, there is no convenient way to detach a security tag. As such, it would be desirable to provide improved tag detach mechanisms.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one example, an article surveillance tag comprises a tag housing, a threaded barrel including a pin and configured to rotate within the tag housing to move the pin in one of two directions, and a rotating collar coupled to the threaded barrel and configured to rotate within the tag housing in response to an applied magnetic field, wherein the rotation of the rotating collar drives the threaded barrel including the pin to move in one of the two directions.

In another example, a detacher for an article surveillance tag comprises an exterior housing having a recess to receive the article surveillance tag, and a cylindrical rotor including a magnetic array configured to magnetically couple with and trigger rotation of a rotating collar of the article surveillance tag when engaged in a rotation state.

In a further example, a method of detaching an article surveillance tag comprises receiving the article surveillance tag within a detacher, rotating the article surveillance tag within the detacher to generate a magnetic field detectable by a magnetic element of the article surveillance tag, and retracting a pin of the article surveillance tag in response to the rotation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
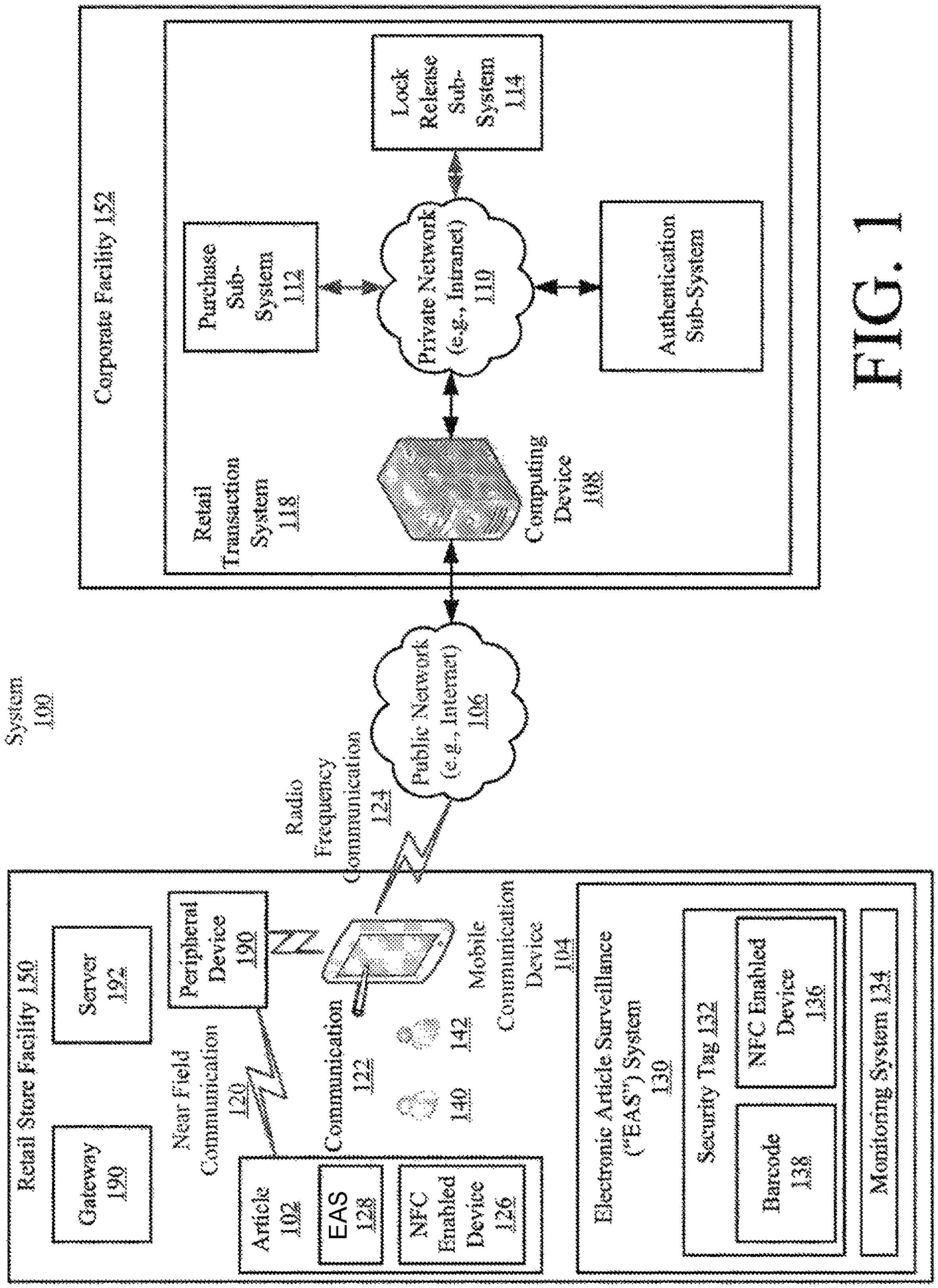
FIG. 1 is a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the speci features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure relates to radio frequency identification (RFID) and/or electronic article surveillance (EAS) tags used with apparel and other soft goods. A common problem with existing tag detach schemes using magnetic clutches and mechanical hook keys is the defeat of these locking mechanism through the use of unauthorized high strength magnets, mechanical tools or copies of the mechanical detacher hook. Conventional solutions may use stronger magnet arrays in the detaching stations, or more elaborate mechanical keys. Electronic or optical detaching mechanisms generally require the use of batteries or other energy storage devices in the tag which drive up product cost and present long term reliability problems.

As such, the present implementations provide a mechanism inside of the tag which detaches the tag when presented to a detacher system containing a rotating magnet array that retracts the tag pin allowing the tag to be removed from the garment. That is, the mechanism provides the use of a rotating magnet array to mechanically remove the tag, and the use of a specialized magnet array in the design to prevent easy defeat. The tag mechanism may be purely mechanical with no electronic circuits or battery required. The system may be difficult to defeat using handheld magnets since it requires a specialized rotating magnetic field and a unique magnetic pattern in the magnetic elements used in the mechanism.

In one example, an article surveillance tag may include a tag housing, a threaded barrel including a pin and configured to rotate within the tag housing to move the pin in one of two directions. The article surveillance tag may further include a rotating collar coupled to the threaded barrel and configured to rotate within the tag housing in response to an applied magnetic field, the rotation of the rotating collar drives the threaded barrel including the pin to move in one of the two directions.

In another example, a detacher for an article surveillance tag may include an exterior housing having a recess to receive the article surveillance tag. The detacher may further include a cylindrical rotor including a magnetic array configured to magnetically couple with and trigger rotation of a rotating collar of the article surveillance tag when engaged in a rotation state.

In a further example, a method of detaching an article surveillance tag may include receiving the article surveillance tag within a detacher. The method may further include rotating the article surveillance tag within the detacher to generate a magnetic field detectable by a magnetic element of the article surveillance tag, and retracting a pin of the article surveillance tag in response to the rotation.

Referring now to FIG. 1, there is provided a schematic illustration of an exemplary system 100 that is useful for understanding the present implementations. System 100 is generally configured to allow a customer to purchase an article 102 using a Mobile Communication Device ("MCD") 104 and an optional Peripheral Device ("PD") 190 thereof. The PD 190 is designed to be mechanically attached to the MCD 104. In some scenarios, PD 190 wraps around at least a portion of MCD 104. Communications between MCD 104 and PD 190 are achieved using a wireless Short Rage Communication ("SRC") technology, such as a Bluetooth technology. PD 190 also employs other wireless SRC technologies to facilitate the purchase of article 102. The other wireless SRC technologies can include, but are not limited to, Near Field Communication ("NFC") technology, Infrared ("IR") technology, Wireless Fidelity ("Wi-Fi") technology, Radio Frequency Identification ("RFID") technology, and/or ZigBee technology. PD 190 may also employ barcode technology, electronic card reader technology, and Wireless Sensor Network ("WSN") communications technology.

As shown in FIG. 1, system 100 comprises a retail store facility 150 including an EAS 128. The EAS 128 comprises a monitoring system 134 and at least one security tag 132. Although not shown in FIG. 1, the security tag 132 is attached to article 102, thereby protecting the article 102 from an unauthorized removal from the retail store facility 150. The monitoring system 134 establishes a surveillance zone (not shown) within which the presence of the security tag 132 can be detected. The surveillance zone is established at an access point (not shown) for the retail store facility 150. If the security tag 132 is carried into the surveillance zone, then an alarm is triggered to indicate a possible unauthorized removal of article 102 from the retail store facility 150.

During store hours, a customer 140 may desire to purchase the article 102. In some aspects, the purchase transaction can be achieved using MCD 104 and/or PD 190. MCD 104 (e.g., a mobile phone or tablet computer) can be in the possession of the customer 140 or store associate 142 at the time of the purchase transaction. Notably, MCD 104 has a retail transaction application installed thereon that is configured to facilitate the purchase of article 102 and the management/control of PD 190 operations for an attachment/detachment of the security tag 132 to/from article 102. The retail transaction application can be a pre-installed application, an add-on application or a plug-in application.

In order to initiate a purchase transaction, the retail transaction application is launched via a user-software interaction. The retail transaction application facilitates the exchange of data between the article 102, security tag 132, customer 140, store associate 142, and/or Retail Transaction System ("RTS") 118. For example, after the retail transaction application is launched, a user 140, 142 is prompted to start a retail transaction process for purchasing the article 102. The retail transaction process can be started simply by performing a user software interaction, such as depressing a key on a keypad of the MCD 104 or touching a button on a touch screen display of the MCD 104.

Subsequently, the user 140, 142 may manually input into the retail transaction application article information. Alternatively or additionally, the user 140, 142 places the MCD 104 in proximity of article 102. As a result of this placement, the MCD 104 and/or PD 190 obtains article information from the article 102. The article information includes any information that is useful for purchasing the article 102, such as an article identifier and an article purchase price. In some scenarios, the article information may even include an identifier of the security tag 132 attached thereto. The article information can be communicated from the article 102 to the MCD 104 and/or PD 190 via a short range communication, such as a barcode communication 122 or an NFC 120. In the barcode scenario, article 102 has a barcode 128 attached to an exposed surface thereof. In the NFC scenarios, article 102 may comprise an NFC enabled device 126. If the PD 190 obtains the article information, the information may be forwarded to MCD 104 via a wireless SRC, such as a Bluetooth communication.

Thereafter, payment information is input into the retail transaction application of MCD 104 by the user 140, 142. Upon obtaining the payment information, the MCD 104 automatically performs operations for establishing a retail transaction session with the RTS 118. The retail transaction session can involve: communicating the article information and payment information from MCD 104 to the RTS 118 via an RF communication 124 and/or public network 106 (e.g., the Internet); completing a purchase transaction by the RTS 118; and communicating a response message from the RTS 118 to MCD 104 indicating that the article 102 has been successfully or unsuccessfully purchased. The purchase transaction can involve using an authorized payment system, such as a bank Automatic Clearing House ("ACH") payment system, a credit/debit card authorization system, or a third party system (e.g., PayPal®, SolidTrust Pay® or Google Wallet®).

The purchase transaction can be completed by the RTS 118 using the article information and payment information. In this regard, such information may be received by a computing device 108 of the RTS 118 and forwarded thereby to a sub-system of a private network 100 (e.g., an Intranet). For example, the article information and purchase information can also be forwarded to and processed by a purchase sub-system 112 to complete a purchase transaction. When the purchase transaction is completed, a message is generated and sent to the MCD 104 indicating whether the article 102 has been successfully or unsuccessfully purchased.

Figure 3A:
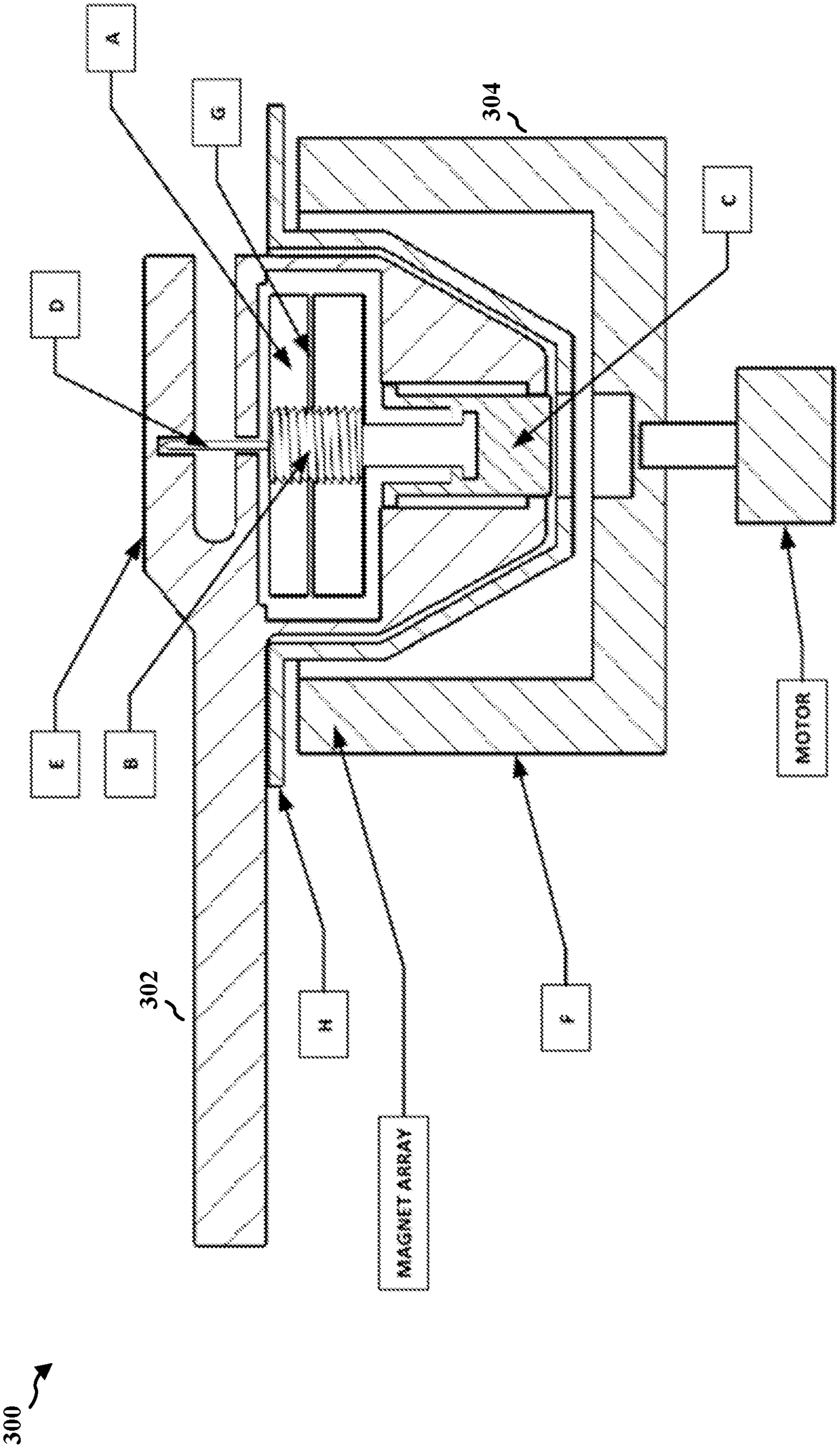
FIG. 3A is a side view of an exemplary security tag and detacher in a locked state.
Figure 3B:
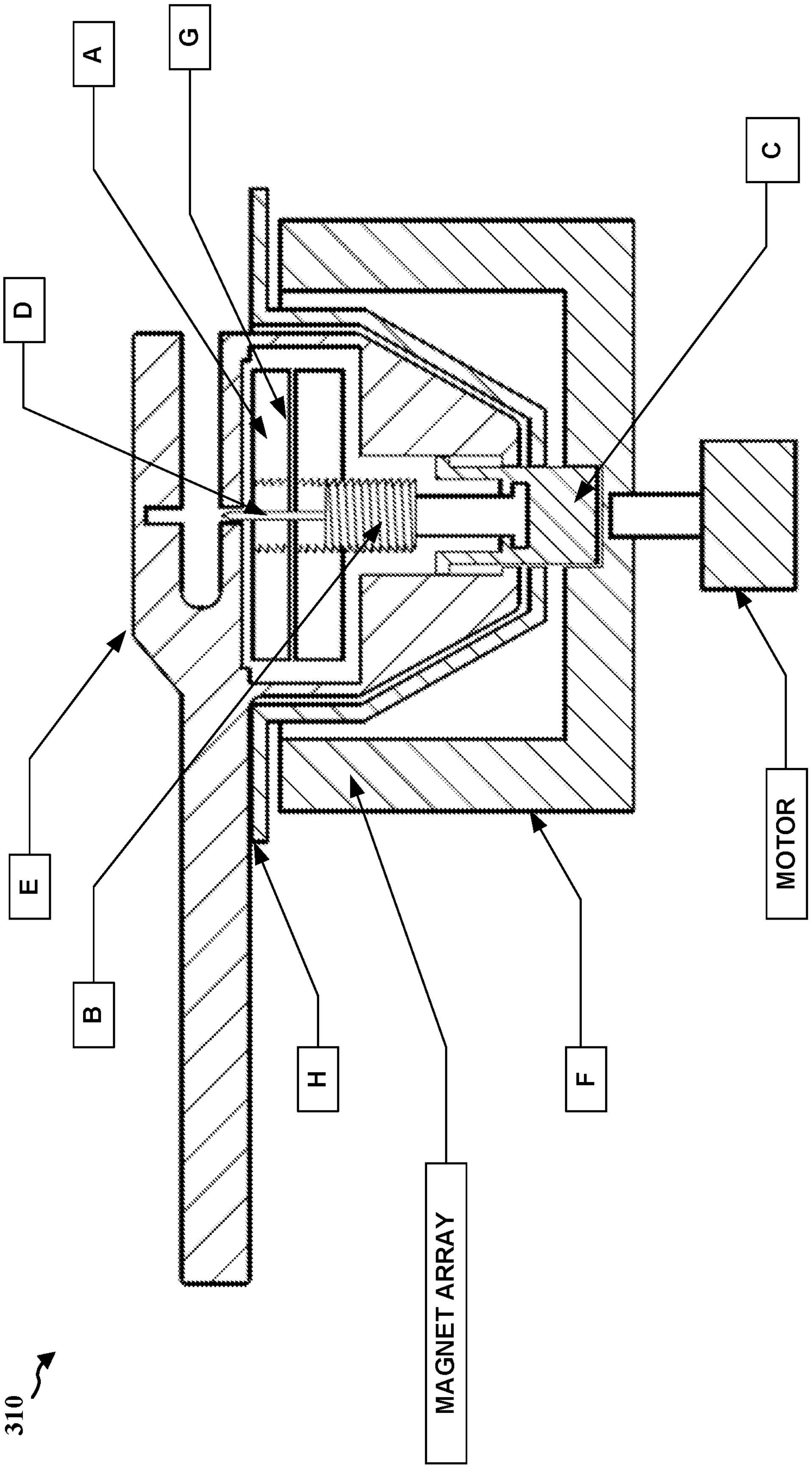
FIG. 3B is a side view of an exemplary security tag and detacher in an unlocked state.
Figure 3C:
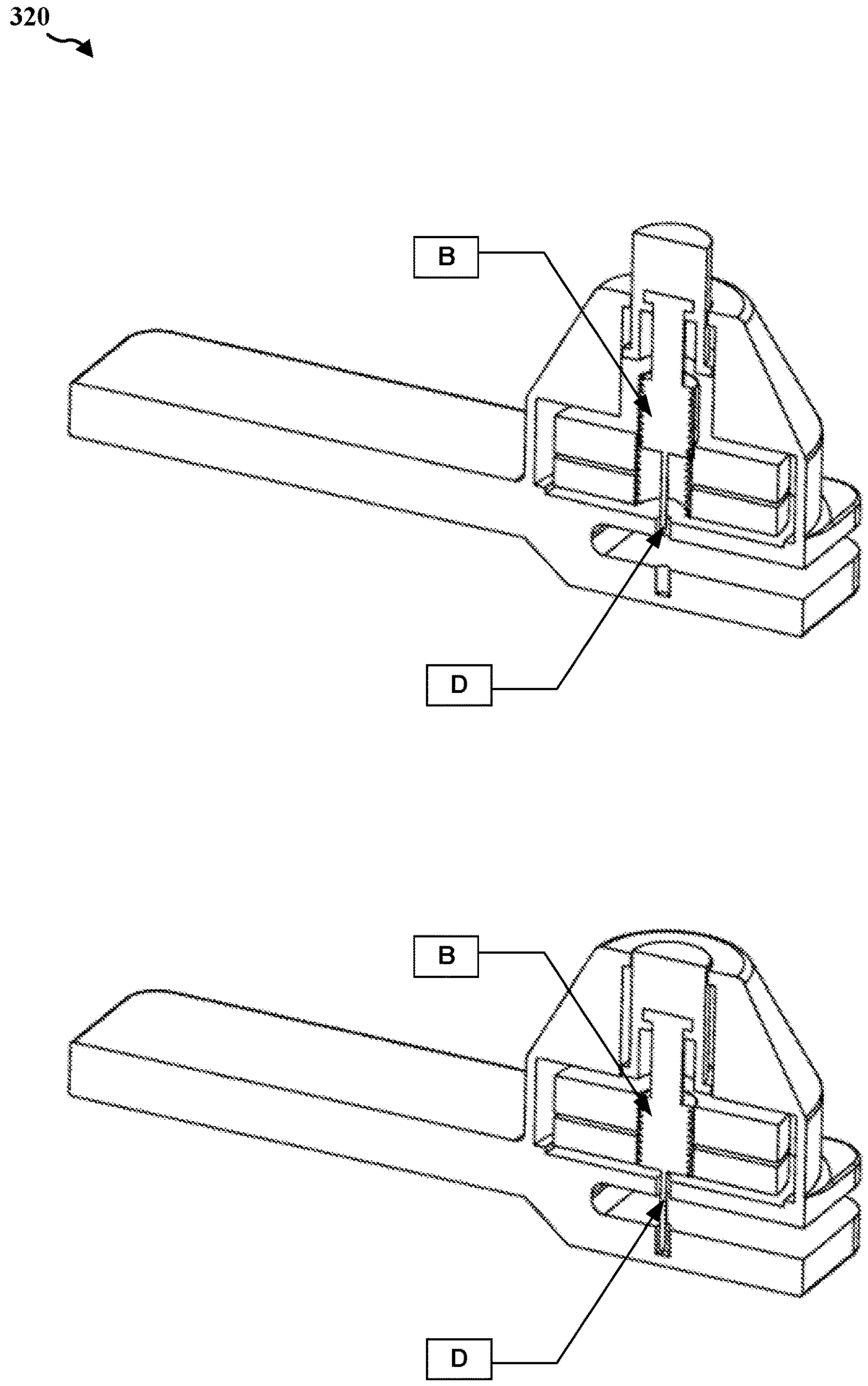
FIG. 3C illustrate two cutaway views of the security tag shown in FIGS. 3A and 3B.
Figure 3D:
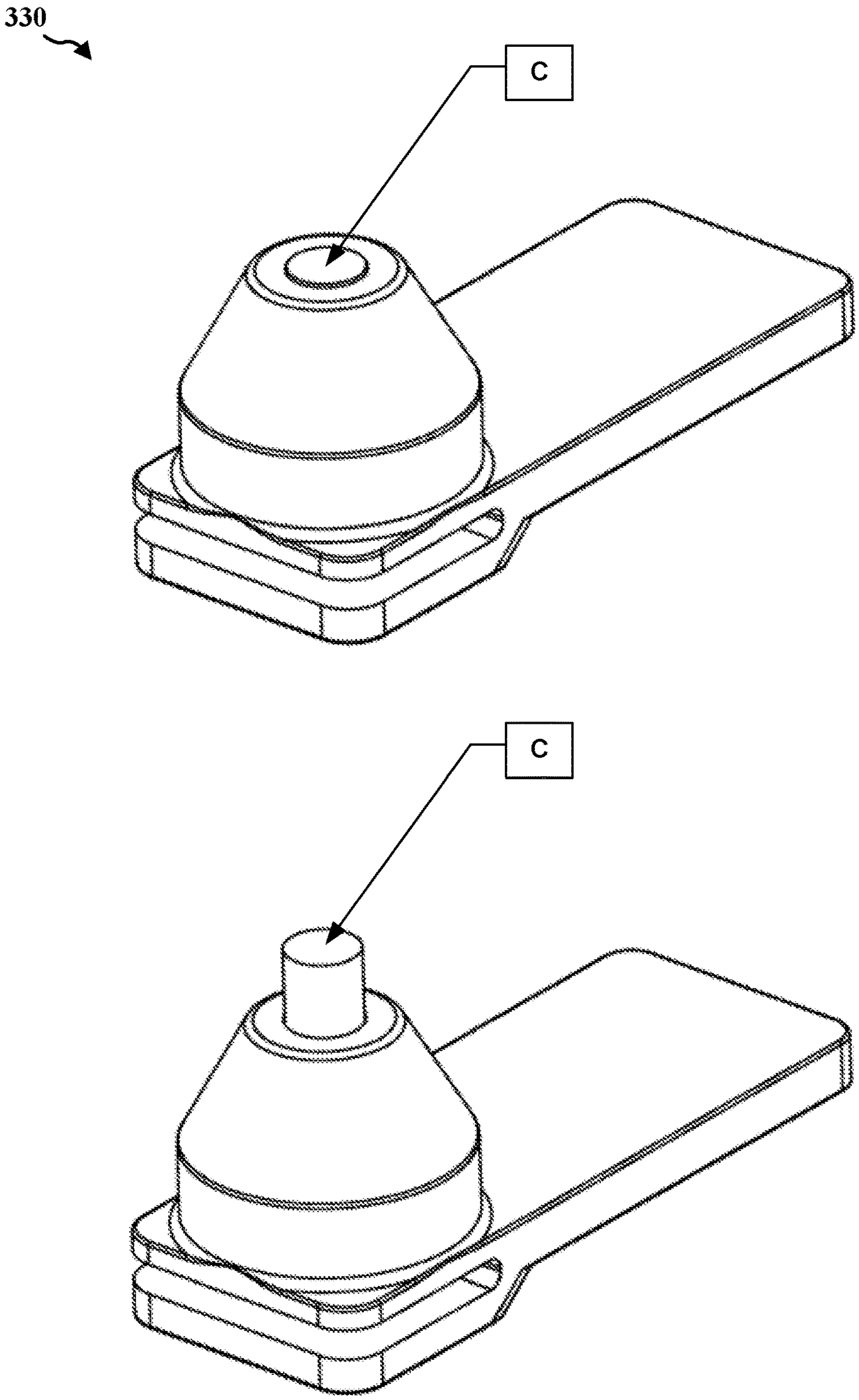
FIG. 3D illustrate two views of the exterior of the security tag shown in FIGS. 3A and 3B.
Figure 3E:
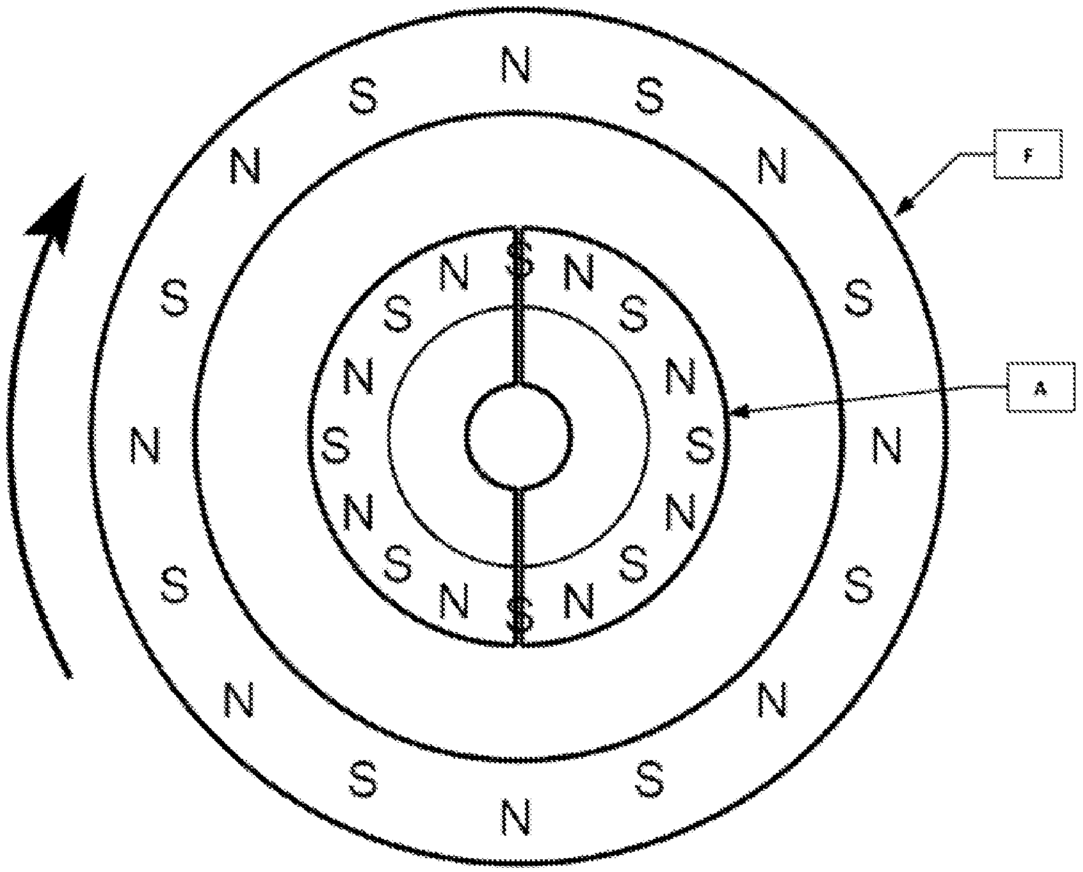
FIG. 3E is a top view of an example magnetic rotor and tag collar of the security tag shown in FIGS. 3A-3D.
Figure 3F:
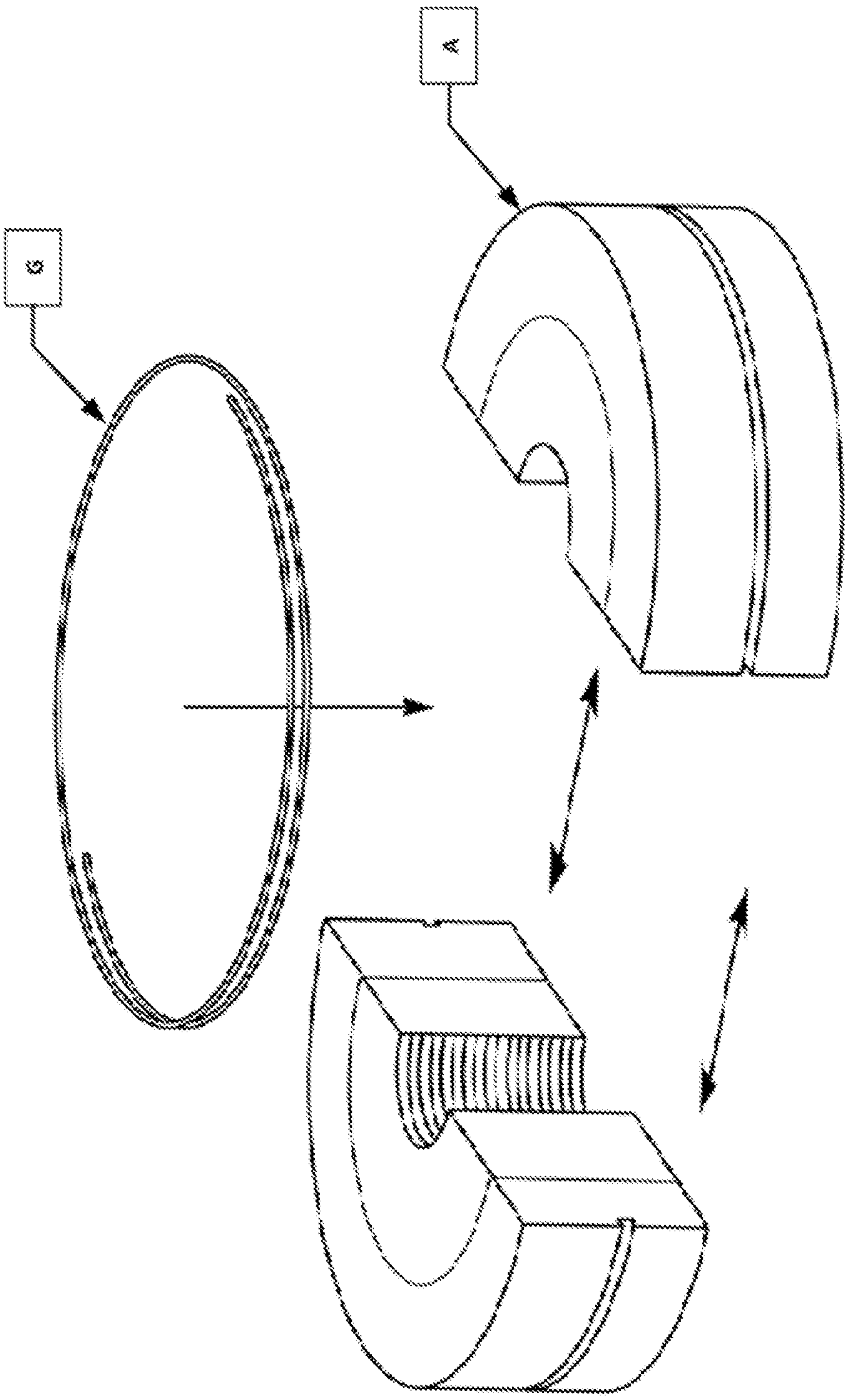
FIG. 3F is an example of the collar halves and spring of the security tag shown in FIGS. 3A and 3B.
Figure 4:
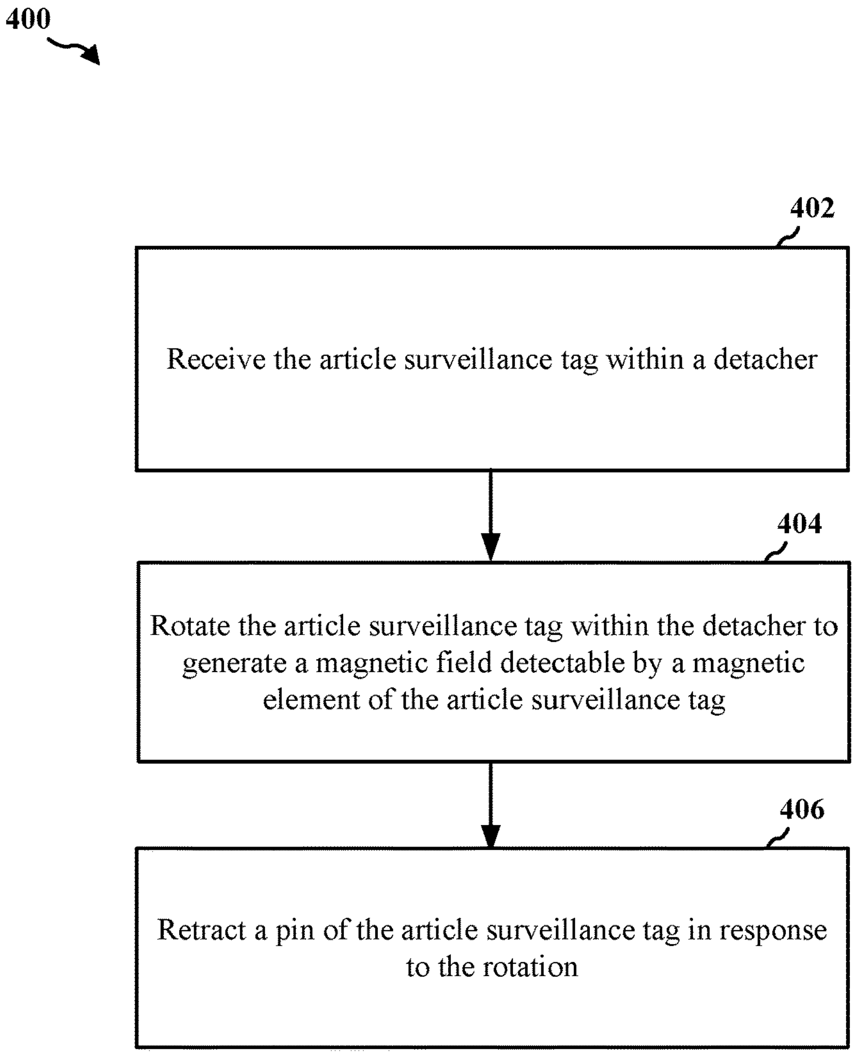
FIG. 4 is an example flow diagram of a method of detaching an article surveillance tag, e.g., according to the aspects of FIGS. 3A-3D.

If the article 102 has been successfully purchased, then a security tag detaching process can be started automatically by the RTS 118 or by the MCD 104. Alternatively, the user 140, 142 can start the security tag detaching process by performing a user-software interaction using the MCD 104. In all three scenarios, the article information can optionally be forwarded to and processed by a lock release sub-system 114 to retrieve a detachment key or a detachment code that is useful for detaching the security tag 132 from the article 102. The detachment key or code is then sent from the RTS 118 to the MCD 104 such that the MCD 104 can perform or cause the PD 190 to perform the security tag detachment operations. The tag detachment operations are generally configured to trigger a detaching mechanism (as shown in FIGS. 3-5). In this regard, the MCD 104 or PD 190 generates a detach command and sends a wireless detach signal including the detach command to the security tag 132. The security tag 132 authenticates the detach command and activates the detaching mechanism. For example, the detach command causes a pin to be retracted such that the security tag can be removed from the article 102. Once the security tag 132 has been removed from article 102, the customer 140 can carry the article 102 through the surveillance zone without setting off the alarm.

Figure 2:
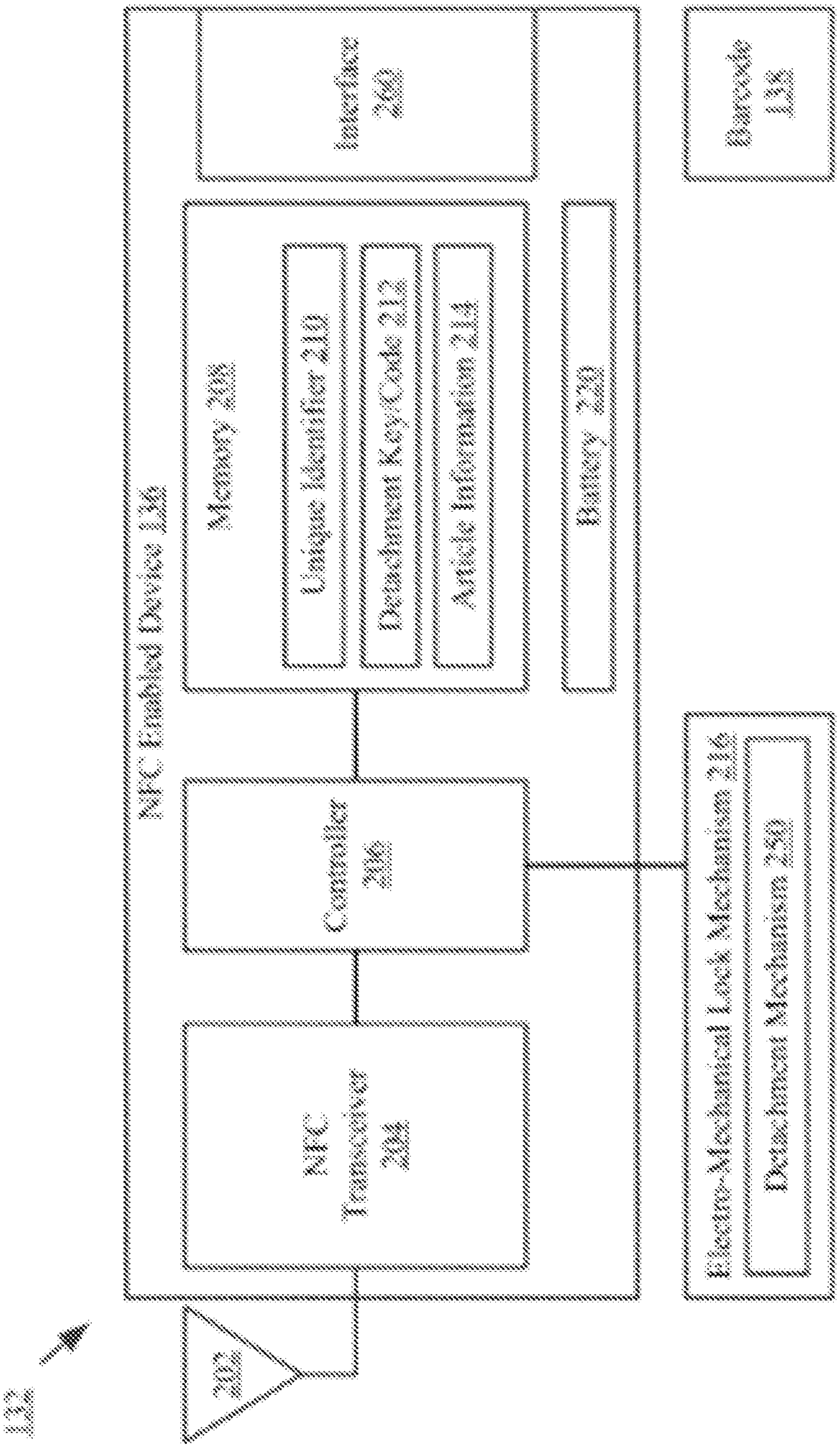
FIG. 2 is a block diagram of an exemplary architecture for a security tag shown in FIG. 1.

Referring now to FIG. 2, there is provided a schematic illustration of an exemplary architecture for a security tag 132. The security tag 132 can include more or less components than shown in FIGS. 3-5. However, the components shown are sufficient to disclose an illustrative embodiment implementing the present invention. Some or all of the components of the security tag 132 can be implemented in hardware, software and/or a combination of hardware and software. The hardware includes, but is not limited to, one or more electronic circuits.

The hardware architecture of FIG. 2 represents an embodiment of a representative security tag 132 configured to facilitate the prevention of an unauthorized removal of an article (e.g., article 102 of FIG. 1) from a retail store facility (e.g., retail store facility 150 of FIG. 1). In this regard, the security tag 132 may have a barcode 138 affixed thereto for allowing data to be exchanged with an external device (e.g., PD 190 of FIG. 1) via barcode technology.

The security tag 132 also comprises an antenna 202 and an NFC enabled device 136 for allowing data to be exchanged with the external device via NFC technology. The antenna 202 is configured to receive NFC signals from the external device and transmit NFC signals generated by the NFC enabled device 136. The NFC enabled device 136 comprises an NFC transceiver 204. NFC transceivers are well known in the art, and therefore will not be described herein. However, it should be understood that the NFC transceiver 204 processes received NFC signals to extract information therein. This information can include, but is not limited to, a request for certain information (e.g., a unique identifier 210), and/or a message including information specifying a detachment key or code for detaching the security tag 132 from an article. The NFC transceiver 204 may pass the extracted information to the controller 206.

If the extracted information includes a request for certain information, then the controller 206 may perform operations to retrieve a unique identifier 210 and/or article information 214 from memory 208. The article information 214 can include a unique identifier of an article and/or a purchase price of the article. The retrieved information is then sent from the security tag 132 to a requesting external device (e.g., PD 190 of FIG. 1) via an NFC communication.

In contrast, if the extracted information includes information specifying a one-time-only use key and/or instructions for programming the security tag 132 to actuate a detachment mechanism 250 of an electro-mechanical lock mechanism 216, then the controller 206 may perform operations to simply actuate the detachment mechanism 250 using the one-time-only key. Alternatively or additionally, the controller 206 can: parse the information from a received message; retrieve a detachment key/code 212 from memory 208; and compare the parsed information to the detachment key/code to determine if a match exists there between. If a match exists, then the controller 206 generates and sends a command to the electro-mechanical lock mechanism 216 for actuating the detachment mechanism 250. An auditory or visual indication can be output by the security tag 132 when the detachment mechanism 250 is actuated. If a match does not exist, then the controller 206 may generate a response message indicating that detachment key/code specified in the extracted information does not match the detachment key/code 212 stored in memory 208. The response message may then be sent from the security tag 132 to a requesting external device (e.g., PD 190 of FIG. 1) via a wireless short-range communication or a wired communication via interface 260. A message may also be communicated to another external device or network node via interface 260.

In some scenarios, the connections between components 204, 206, 208, 216, and 260 are unsecure connections or secure connections. The phrase "unsecure connection", as used herein, refers to a connection in which cryptography and/or tamper-proof measures are not employed. The phrase "secure connection", as used herein, refers to a connection in which cryptography and/or tamper-proof measures are employed. Such tamper-proof measures include enclosing the physical electrical link between two components in a tamper-proof enclosure.

Notably, the memory 208 may be a volatile memory and/or a non-volatile memory. For example, the memory 208 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 208 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The electro-mechanical lock mechanism 216 is operable to actuate the detachment mechanism 250. The detachment mechanism 250 can include a lock configured to move between a lock state and an unlock state. Such a lock can include, but is not limited to, a pin. The electro-mechanical lock mechanism 216 is shown as being indirectly coupled to NFC transceiver 204 via controller 206. The invention is not limited in this regard. The electro-mechanical lock mechanism 216 can additionally or alternatively be directly coupled to the NFC transceiver 204. One or more of the components 204, 206 can cause the lock of the detachment mechanism 250 to be transitioned between states in accordance with information received from an external device (e.g., PD 190 of FIG. 1). The components 204-208, 260 and a battery 220 may be collectively referred to herein as the NFC enabled device 136.

The NFC enabled device 136 can be incorporated into a device which also houses the electro-mechanical lock mechanism 216, or can be a separate device which is in direct or indirect communication with the electro-mechanical lock mechanism 216. In some aspects, the NFC enabled device 136 may be coupled to a power source. The power source may include, but is not limited to, battery 220 or an A/C power connection (not shown). Alternatively or additionally, the NFC enabled device 136 is configured as a passive device which derives power from an RF signal inductively coupled thereto.

Exemplary architectures for a security tag and detacher system 300 will now be described in detail in relation to FIGS. 3A-3F. The security tag 134 is the same as or similar to security tag 302. As such, the following discussion of security tag 302 is sufficient for understanding various features of the security tag 134.

The security tag 302 may include a conventional pin which pierces the fabric of the garment it is attached to. (e.g., D). A threaded barrel (e.g., B), attached to or part of the pin. This barrel is keyed to prevent rotation in the tag housing (e.g., E). A rotating collar (e.g., A) which may have a threaded opening, which as shown in FIGS. 3A-3C may be configured to threadingly engage with or mate with and receive therein the threaded barrel and pin. The threaded opening may be alternatively referred to as a threaded barrel receiving portion. This part of the mechanism can rotate freely in the tag housing. The collar may be split in two halves and is composed of two main materials: a center threaded section made of durable steel or other metal, and an outer section constructed of ceramic or other permanent magnetic material. A wire spring (e.g., G) may surround the collar. This wire spring holds the two halves of the collar tightly together around the threaded barrel that it mates with.

The threads of the threaded barrel may be designed in an asymmetric profile that allows the threaded barrel to be pushed by hand (and the plunger button e.g., C) through the threads of the split collar (e.g., A), forcing the two halves of the collar apart. This process of pushing the threaded barrel through the split collar may be performed when the tag is attached to the garment. The threads may be designed with fine pitch, requiring numerous rotations of the collar to fully retract the pin. This would prevent defeat by simply rotating a handheld magnet.

Similarly the asymmetric thread profile may not allow the threaded barrel to be forced in the opposite direction through the split collar. This prevents tag defeats in which the plunger is pulled to retract the pin, or defeats where the pin is pushed back into the housing. The wire spring may be designed to provide enough force to hold the split collar together, yet allow the threaded barrel to separate the collar halves and slide the pin into the attach position.

The detacher 304 may include an exterior housing (e.g., H) with a circular recess to receive the tag for detaching. Optionally, the recess could be designed with a square or asymmetric shape to prevent rotation of the tag during the detach process.

A cylindrical rotor in the detacher interior (e.g., F) with an array of permanent magnets may couple magnetically with the tag's rotating collar. The rotor spins (driven by a motor) causing the tag's rotating collar (e.g., A) to rotate. This may cause the threaded barrel in the tag to retract via the threads, pulling the pin back inside the housing.

The magnetic features (pole locations and magnetic strength) may be designed to provide strong mechanical coupling between the driven rotor and the tag's rotating collar. The magnetic design of this feature would be made sufficiently complex to prevent easy defeat. Various control schemes can be applied to the rotor drive motor to enable/disable the motors and to control acceleration and deceleration to optimize performance of the detaching process.

Usage of anti-theft tags prevents loss for retailers, but frequently adds a level of inconvenience to store cashiers and customers. Ideally anti-theft solutions should be secure while at the same time enhance customer experience. From the customer's point of view, the ideal solution would require very little time and technical knowledge. The following methods provide such an ideal solution.

Referring now to FIG. 4, there is provided a flow diagram of an exemplary method 400 for operating a security tag. At block 402, the method 400 may receive the article surveillance tag (e.g., security tag 132 of FIG. 1 or 300 of FIG. 3) within a detacher (e.g., 302 of FIG. 3). At 404, the method 400 may rotate the article surveillance tag within the detacher to generate a magnetic field detectable by a magnetic element of the article surveillance tag. At 406, the method 400 may retract a pin of the article surveillance tag in response to the rotation.

In some aspects, the rotating collar may include a first collar portion composed of a first material and a second collar portion composed of a second material.

In some aspects, the first material may correspond to a non-magnetic material and the second material corresponds to a magnetic material.

In some aspects, the security tag may include a wire spring surrounding the rotating collar and configured to hold the first collar portion and the second collar portion together.

In some aspects, the magnetic material includes a distinct magnetic pattern.

In some aspects, the threaded barrel includes a fine pitch.

In some aspects, the threaded barrel includes an asymmetric thread profile.

In some aspects, the threaded barrel is keyed to prevent rotation within the tag housing.

In some aspects, a first one of the two directions corresponds to movement of the threaded barrel within an interior of the article surveillance tag, and a second one of the two directions corresponds to movement of the threaded barrel outside the interior of the article surveillance tag.

In some aspects, a magnetic array of the detacher includes an array magnetic pattern.

In some aspects, the array magnetic pattern matches a distinct magnetic pattern of the article surveillance tag.

In some aspects, the recess may be circular or asymmetric.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. An article surveillance tag, comprising:

a tag housing;

a threaded barrel having threads and a pin, wherein the pin is movable between a retracted position and an extended position;

a rotating collar with a first collar portion and a second collar portion rotatably positioned within the tag housing, wherein the rotating collar includes a threaded opening with a first portion of the threaded opening as part of the first collar portion and a second portion of the threaded opening as part of the second collar portion and configured to threadingly engage with and receive therein the threaded barrel, wherein the rotating collar is configured to rotate within the tag housing in response to a rotating magnetic field; and wherein rotation of the rotating collar and interaction between the threaded barrel and the threaded opening cause the pin to move linearly in a retraction direction to the retracted position and wherein in response to a first force linearly applied to the threaded barrel in a direction opposite the retraction direction, the first collar portion and the second collar portion separate allowing the pin to move linearly in the direction opposite the retraction direction.

2. The article surveillance tag of claim 1, wherein the rotating collar is configured to rotate about a rotation axis in response to the rotating magnetic field applied by a detacher, and the retraction direction is along an axis parallel to or co-axial with the rotation axis.

3. The article surveillance tag of claim 1, further comprising a wire spring configured to hold the first collar portion and the second collar portion together.

4. The article surveillance tag of claim 3, wherein the wire spring surrounds the rotating collar.

5. The article surveillance tag of claim 1, wherein the first collar portion is composed of a first material and the second collar portion is composed of a second material.

6. The article surveillance tag of claim 5, wherein the first material is a non-magnetic material and the second material is a magnetic material.

7. The article surveillance tag of claim 6, wherein the magnetic material includes a first magnetic pattern configured to couple with a second magnetic pattern of a rotating magnetic array of a detacher.

8. The article surveillance tag of claim 1, wherein the rotating collar is configured to rotate for a plurality of rotations to cause the pin to move linearly in the retraction direction to the retracted position.

9. The article surveillance tag of claim 1, wherein the threads of the threaded barrel have an asymmetric thread profile that allows the pin to move to the extended position in response to the first force applied to the threaded barrel in the direction opposite the retraction direction, and wherein the asymmetric thread profile prevents movement of the pin to the extended position in response to a second force applied to the threaded barrel in the retraction direction.

10. The article surveillance tag of claim 1, wherein the threaded barrel is keyed to prevent rotation with respect to the tag housing.

11. An article surveillance tag, comprising:

a tag housing;

a threaded barrel having threads and a pin, wherein the pin is movable between a retracted position and an extended position;

a rotating collar rotatably positioned within the tag housing, wherein the rotating collar includes a threaded opening configured to threadingly engage with and receive therein the threaded barrel, wherein the rotating collar is configured to rotate within the tag housing in response to a rotating magnetic field; and wherein rotation of the rotating collar and interaction between the threaded barrel and the threaded opening cause the pin to move linearly in a retraction direction to the retracted position; and a spring;

wherein the rotating collar comprises a split collar having a first collar portion that includes a first portion of the threaded opening and a second collar portion that includes a second portion of the threaded opening, wherein the first collar portion is on a first side of a plane that intersects a rotation axis of the rotating collar and the second collar portion is on a second side of the plane that intersects the rotation axis;

wherein the threads of the threaded barrel have an asymmetric thread profile that allows the pin to move to the extended position in response to a first force applied to the threaded barrel in a direction opposite the retraction direction, and wherein the asymmetric thread profile prevents movement of the pin to the retracted position in response to a second force applied to the threaded barrel in the retraction direction; and wherein the spring has a biasing force to hold together the split collar together, wherein the first force overcomes the biasing force.

12. An article surveillance tag, comprising:

a tag housing;

a threaded barrel having threads and including a pin; and a rotating collar within the tag housing, wherein the rotating collar includes a threaded barrel receiving portion configured to threadingly engage with and receive therein the threaded barrel, wherein the rotating collar is configured to rotate within the tag housing in response to a rotating magnetic field applied by a rotating magnetic array of a detacher;

wherein in response to a rotation of the rotating collar, the threaded barrel receiving portion is configured to interact with the threads of the threaded barrel to provide a driving force to the threaded barrel to cause the pin to move linearly in a pin retraction direction to a retracted position within the tag housing to allow the article surveillance tag to be removed from an article.

13. The article surveillance tag of claim 12, wherein the rotating collar is configured to rotate about a rotation axis in response to the rotating magnetic field applied by the detacher, and the pin retraction direction is along an axis parallel to or co-axial with the rotation axis.

14. The article surveillance tag of claim 12, further comprising a plunger button, wherein, in response to an applied force, the plunger button is configured to cause the pin to move linearly in a pin advancement direction toward an extended position outside of the tag housing, wherein the pin advancement direction is opposite the pin retraction direction.

15. The article surveillance tag of claim 12, wherein the rotating collar includes a first collar portion that includes a first portion of the threaded barrel receiving portion and a second collar portion that includes a second portion of the threaded barrel receiving portion, wherein the first portion of the threaded barrel receiving portion and the second portion of the threaded barrel receiving portion face each other across a plane that intersects a rotation axis of the rotating collar.

16. The article surveillance tag of claim 15, further comprising a biasing member configured to hold together the first collar portion and the second collar portion when the article surveillance tag is removed from the article and to allow separation of the first collar portion and the second collar portion when the article surveillance tag is attached to the article.

17. The article surveillance tag of claim 16, wherein the threads of the threaded barrel have an asymmetric thread profile that prevents movement of the threaded barrel in the pin retraction direction in response to a first force in the pin retraction direction, and allows the threaded barrel to be advanced through the first portion of the threaded barrel receiving portion and the second portion of the threaded barrel receiving portion in response to a second force in another direction opposite the pin retraction direction that causes the first collar portion and the second collar portion to separate.

18. The article surveillance tag of claim 17, wherein the biasing member comprises a wire spring that surrounds the first collar portion and the second collar portion in another plane perpendicular to the rotation axis of the rotating collar.

19. The article surveillance tag of claim 12, wherein the rotating collar comprises a material having a first magnetic pattern configured to couple with a second magnetic pattern of the rotating magnetic array of the detacher.

20. The article surveillance tag of claim 12, further comprising:

wherein the rotating collar comprises a split collar having a first collar portion that includes a first portion of the threaded barrel receiving portion and a second collar portion that includes a second portion of the threaded barrel receiving portion, wherein the first collar portion is on a first side of a plane that intersects a rotation axis of the rotating collar and the second collar portion is on a second side of the plane that intersects the rotation axis;

wherein the threads of the threaded barrel have an asymmetric thread profile that allows the pin to move to an extended position in response to a first force applied to the threaded barrel in a direction opposite the pin retraction direction, and wherein the asymmetric thread profile prevents movement of the pin to the retracted position in response to a second force applied to the threaded barrel in the pin retraction direction; and a biasing member having a biasing force to hold together the split collar, wherein the first force overcomes the biasing force to cause the split collar to separate and enable the pin to slide into the extended position.

* * * * *